(12) United States Patent
Kawahara et al.

(10) Patent No.: US 10,260,612 B2
(45) Date of Patent: Apr. 16, 2019

(54) HYDRAULIC POWER TRANSMISSION DEVICE

(71) Applicant: EXEDY Corporation, Neyagawa-shi, Osaka (JP)

(72) Inventors: Yuki Kawahara, Neyagawa (JP); Yusuke Okamoto, Neyagawa (JP); Yusuke Okamachi, Neyagawa (JP)

(*) Notice: Subject to any disclaimer, the term of this patent is extended or adjusted under 35 U.S.C. 154(b) by 179 days.

(21) Appl. No.: 15/502,713

(22) PCT Filed: Jan. 23, 2015

(86) PCT No.: PCT/JP2015/051926
§ 371 (c)(1),
(2) Date: Feb. 8, 2017

(87) PCT Pub. No.: WO2016/031259
PCT Pub. Date: Mar. 3, 2016

(65) Prior Publication Data
US 2017/0234416 A1    Aug. 17, 2017

(30) Foreign Application Priority Data

Aug. 29, 2014  (JP) ................ 2014-175223

(51) Int. Cl.
*F16H 45/02* (2006.01)
*F16F 15/123* (2006.01)
*F16F 15/14* (2006.01)

(52) U.S. Cl.
CPC ....... *F16H 45/02* (2013.01); *F16F 15/12353* (2013.01); *F16F 15/145* (2013.01);
(Continued)

(58) Field of Classification Search
CPC ............ F16H 45/02; F16H 2045/0263; F16H 2045/0205; F16H 2045/0226; F16H 2045/0294; F16F 15/145; F16F 15/12353
See application file for complete search history.

(56) References Cited

U.S. PATENT DOCUMENTS 5,713,442 A    2/1998   Murata et al.
7,207,889 B2 *  4/2007   Fukushima ....... F16F 15/13178
                                                188/76
(Continued)

FOREIGN PATENT DOCUMENTS

CN       101779051 A1    7/2010
DE    102011101156 A1   11/2011
(Continued)

OTHER PUBLICATIONS

International Search Report for Int'l App. No. PCT/JP2015/051926, dated Mar. 31, 2015, 1-2.
(Continued)

*Primary Examiner* — Jacob S. Scott
*Assistant Examiner* — Tinh T Dang
(74) *Attorney, Agent, or Firm* — United IP Counselors, LLC (57) ABSTRACT

A device includes a front cover, a torque converter main body, a lock-up device, and a dynamic damper. The dynamic damper is fixed to an output plate of the lock-up device. The dynamic damper has a base plate, an inertial body that includes inertia rings and lid members, and an elastic unit. The base plate is fixed to the output plate. The inertial body can rotate relative to the base plate. The elastic unit can generate a variable hysteresis torque according to a relative rotation angle difference between the base plate and the inertial body, and couples the base plate and the inertial body elastically in a rotation direction.

8 Claims, 9 Drawing Sheets

(52) U.S. Cl.
CPC .............. *F16H 2045/0205* (2013.01); *F16H 2045/0226* (2013.01); *F16H 2045/0263* (2013.01); *F16H 2045/0294* (2013.01)

(56) References Cited

U.S. PATENT DOCUMENTS

| | | | | |
|---|---|---|---|---|
| 8,033,918 | B2* | 10/2011 | Yoshimura | F16F 15/1214 |
| | | | | 464/68.41 |
| 8,342,306 | B2* | 1/2013 | Werner | F16F 15/12353 |
| | | | | 192/3.3 |
| 8,403,762 | B2* | 3/2013 | Steinberger | F16F 15/13492 |
| | | | | 192/3.29 |
| 8,695,771 | B2* | 4/2014 | Matsuoka | F16H 45/02 |
| | | | | 192/213.11 |
| 8,998,728 | B2* | 4/2015 | Komuro | F16D 3/14 |
| | | | | 464/68.41 |
| 9,011,257 | B2* | 4/2015 | Kawahara | F16F 15/12366 |
| | | | | 464/68.8 |
| 9,506,547 | B2* | 11/2016 | Tomiyama | F16H 45/02 |
| 9,518,631 | B2* | 12/2016 | Miyahara | F16F 15/145 |
| 9,732,835 | B2* | 8/2017 | Kawahara | F16F 15/1421 |
| 2004/0040815 | A1* | 3/2004 | Fukushima | F16F 15/139 |
| | | | | 192/70.27 |
| 2011/0031083 | A1* | 2/2011 | Matsuoka | F16H 45/02 |
| | | | | 192/3.29 |
| 2011/0287844 | A1 | 11/2011 | Steinberger | |
| 2012/0160627 | A1 | 6/2012 | Kneidel et al. | |
| 2017/0037931 | A1* | 2/2017 | Maienschein | F16F 15/145 |

FOREIGN PATENT DOCUMENTS

| | | |
|---|---|---|
| EP | 0732527 A2 | 9/1996 |
| JP | H5-34339 U | 5/1993 |
| JP | H6-37649 U | 5/1994 |
| JP | H0953700 A | 2/1997 |
| JP | 2001-065665 A | 3/2001 |
| JP | 2011058557 A | 3/2011 |

OTHER PUBLICATIONS

First Office Action of the corresponding Chinese patent application No. 201580045353.6, dated Jul. 4, 2018, 6 pp.

* cited by examiner

HYDRAULIC POWER TRANSMISSION DEVICE

This application is the U.S. National Phase of PCT International Application No. PCT/JP2015/051926, filed on Jan. 23, 2015. That application claims priority to Japanese Patent Application No. 2014-175223, filed Aug. 29, 2014. The contents of both applications are herein incorporated by reference in their entirety.

BACKGROUND

Technical Field

The present disclosure relates to a hydraulic power transmission device and in particular to a hydraulic power transmission device for transmitting power from an engine to a transmission via a fluid.

Background Art

A torque converter that is provided with a lock-up device is known as an example of a hydraulic power transmission device. A lock-up device is a mechanism for mechanically coupling a front cover and a turbine, and is arranged in the space between the turbine and the front cover.

A lock-up device has a clutch portion and a damper mechanism. The clutch portion has a piston that has a friction member, for example. In this device, when the piston moves and the friction member is pressed against the front cover, power is transmitted from the front cover to the damper mechanism via the piston. The damper mechanism has a plurality of elastic members and an output-side member to which power is transmitted via the elastic members. The output-side member is fixed to the turbine.

Such a lock-up device has conventionally been provided with a dynamic damper. Providing a dynamic damper makes it possible to reduce a torque fluctuation peak that appears in the vicinity of the resonance frequency of the damper mechanism.

One large torque fluctuation peak can be suppressed by providing the dynamic damper as described above, but on the other hand, a torque fluctuation peak also appears at two locations, namely a rotational speed higher than and a rotational speed lower than the rotational speed at which the one large peak appears. Out of these two peaks, the peak on the lower rotational speed side appears in a rotational speed range that is lower than the normal rotational speed, and therefore is not a problem during use. However, the peak on the higher rotational speed side commonly appears in the normal rotational speed range, thus making it necessary to attenuate this peak on the higher rotational speed side, and a device for achieving this is shown in Japanese Patent Application Publication No. 2011-58557A.

SUMMARY

In the device in Japanese Patent Application Publication No. 2011-58557A, a lock mechanism is provided for restricting the operation of the dynamic damper in a desired rotational speed range. Here, attenuation performance is raised by the operation of the dynamic damper until a desired rotational speed is reached. When the desired rotational speed is reached, the operation of the dynamic damper is restricted, thereby causing the dynamic damper to function as a simple inertial member. Accordingly, the attenuation performance rises in this rotational speed range.

However, with the device in Japanese Patent Application Publication No. 2011-58557A, fluctuation occurs in the rotational speed at which the operation of the lock mechanism is to be restricted, and it is difficult to stabilize the attenuation performance.

As one method for suppressing the torque fluctuation peak on the high rotational speed side, there is a method of providing a damper mechanism on the output side of the dynamic damper. The inventors of this application have already developed and submitted an application for a device that realizes such a method. However, there are cases where the device configuration of such a device becomes complex.

A problem to be solved by the present disclosure is obtaining stable and high attenuation performance over the entirety of the normal rotational speed range with a simple configuration in a hydraulic power transmission device that has a dynamic damper.

A hydraulic power transmission device according to the present disclosure is a device for transmitting power from an engine to a transmission via a fluid. This device includes a front cover, a fluid coupling main body, a lock-up device, and a dynamic damper. The fluid coupling main body includes a turbine provided in a manner of being capable of rotating integrally with an input shaft of the transmission, and transmits power from the engine to the transmission via the fluid. The lock-up device is provided between the front cover and the turbine. The lock-up device has a clutch portion that transmits or cuts off power from the front cover and an output-side member that receives power from the clutch portion and is coupled to the turbine. The dynamic damper is fixed to the output-side member of the lock-up device, and attenuates rotational speed fluctuation from the engine. Also, the dynamic damper has a base plate, an inertial body, and an elastic unit. The base plate is fixed to the output-side member of the lock-up device. The inertial body is capable of moving in a rotation direction relative to the base plate. The elastic unit can generate a variable hysteresis torque according to a relative rotation angle difference between the base plate and the inertial body, and couples the base plate and the inertial body elastically in the rotation direction.

Here, it is possible to attenuate rotational speed fluctuation by the operation of the dynamic damper that is fixed to the output-side member of the lock-up device. Also, it is established that in the dynamic damper, a torque fluctuation peak appears when the torsion angle of the dynamic damper (relative rotation angle difference between the base plate and the inertial body) has become large.

In view of this, according to the present disclosure, in the elastic unit of the dynamic damper, a variable hysteresis torque is generated according to the relative rotation angle difference between the base plate and the inertial body. For this reason, by generating a large hysteresis at a torsion angle at which a torque fluctuation peak appears, it is possible to suppress a torque fluctuation peak that appears on the high rotational speed side with a simple configuration.

In the hydraulic power transmission device according to another aspect of the present disclosure, the dynamic damper is fixed to the output-side member of the lock-up device.

In the hydraulic power transmission device according to yet another aspect of the present disclosure, the elastic unit has a variable hysteresis torque generation portion that generates a variable hysteresis torque, and an elastic coupling portion that has a plurality of elastic members.

In the hydraulic power transmission device according to still another aspect of the present disclosure, the elastic unit generates a larger hysteresis torque when the relative rotation angle difference between the base plate and the inertial body is large than when the relative rotation angle difference is small.

In the hydraulic power transmission device according to still another aspect of the present disclosure, the inertial body has a first inertia ring that is arranged on one end side in the axial direction of the base plate, and a second inertia ring that is arranged in opposition to the first inertia ring with the base plate therebetween. Also, the variable hysteresis torque generation portion has a pair of friction members and a sliding contact portion. The pair of friction members are provided on mutually opposing side surfaces of the first and second inertia rings. The sliding contact portion is provided in a manner of protruding outward in a diameter direction on an outer circumferential portion of the base plate, and comes into sliding contact with the pair of friction members in a range in which a relative rotation angle difference between the base plate and the first and second inertia rings is large.

In the hydraulic power transmission device according to still another aspect of the present disclosure, the elastic coupling portion has a low-rigidity torsional characteristic in a first range in which a relative rotation angle difference between the base plate and the inertial body is small, and has a high-rigidity torsional characteristic having a higher rigidity than in the low-rigidity torsional characteristic in a second range that is higher than the first range.

In the hydraulic power transmission device according to still another aspect of the present disclosure, the elastic coupling portion has a plurality of first elastic members and a plurality of second elastic members. The plurality of first elastic members couple the base plate and the inertial body elastically in the rotation direction. The plurality of second elastic members couple the base plate and the inertial body elastically in the rotation direction, and operate with a delay after the plurality of first elastic members when the base plate and the inertial body undergo relative rotation.

The present disclosure described above obtains stable and high attenuation performance over the entirety of the normal rotational speed range with a simple configuration in a hydraulic power transmission device that has a dynamic damper.

DETAILED DESCRIPTION OF EMBODIMENTS

Overall Configuration

Figure 1:
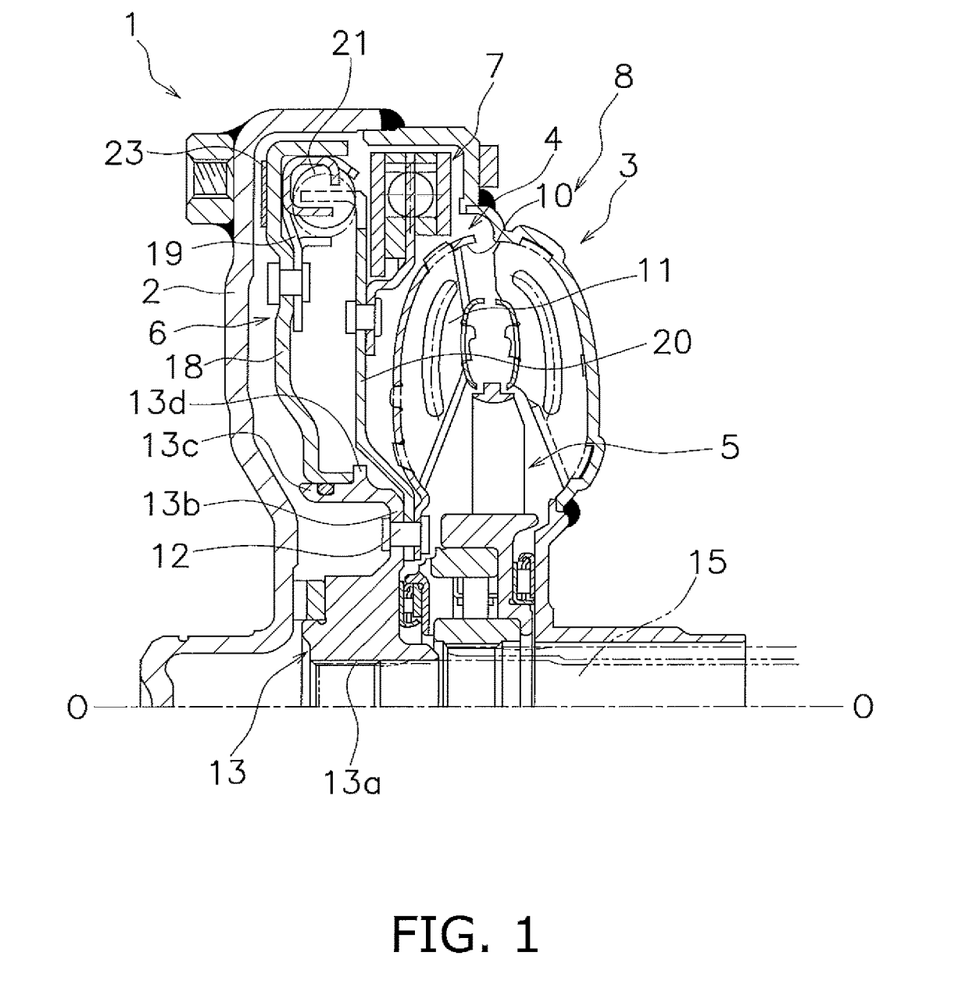
FIG. 1 is a cross-sectional view of a torque converter according to an embodiment of the present disclosure.

A torque converter 1 serving as a hydraulic power transmission device is shown in FIG. 1. An engine (not shown) is arranged on the left side in FIG. 1, and a transmission (not shown) is arranged on the right side in FIG. 1. A line O-O shown in FIG. 1 is the rotation axis of the torque converter 1.

The torque converter 1 is a device for transmitting power from a crankshaft (not shown) of the engine to an input shaft of the transmission. The torque converter 1 is mainly provided with a front cover 2 to which power is input, an impeller 3, a turbine 4, a stator 5, a lock-up device 6, and a dynamic damper 7. A torque converter main body (fluid coupling main body) 8 is configured by the impeller 3, the turbine 4, and the stator 5.

Front Cover 2

The impeller 3 is fixed to the front cover 2, and a fluid chamber is formed by the front cover 2 and the impeller 3. The turbine 4 is arranged in opposition to the impeller 3 inside the fluid chamber. The turbine 4 has a turbine shell 10, a plurality of turbine blades 11 that are provided inside the turbine shell 10, and a turbine hub 13 that is fixed to the turbine shell 10 by rivets 12. The stator 5 is a mechanism for adjusting the flow of hydraulic oil from the turbine 4 to the impeller 3, and is arranged between the inner circumferential portion of the impeller 3 and the inner circumferential portion of the turbine 4.

The turbine hub 13 has a spline hole 13a in its central portion, and an input shaft 15 of the transmission can engage with the spline hole 13a. The turbine hub 13 also has a flange portion 13b that extends radially outward, and a tubular portion 13c that extends from the outer circumferential portion of the flange portion 13b toward the front cover 2. The inner circumferential portion of the turbine shell 10 is fixed to the flange portion 13b by the rivets 12 as previously mentioned. Also, a protrusion 13d that protrudes farther radially outward is formed on the outer circumferential face of the tubular portion 13c.

Lock-Up Device 6

Figure 2:
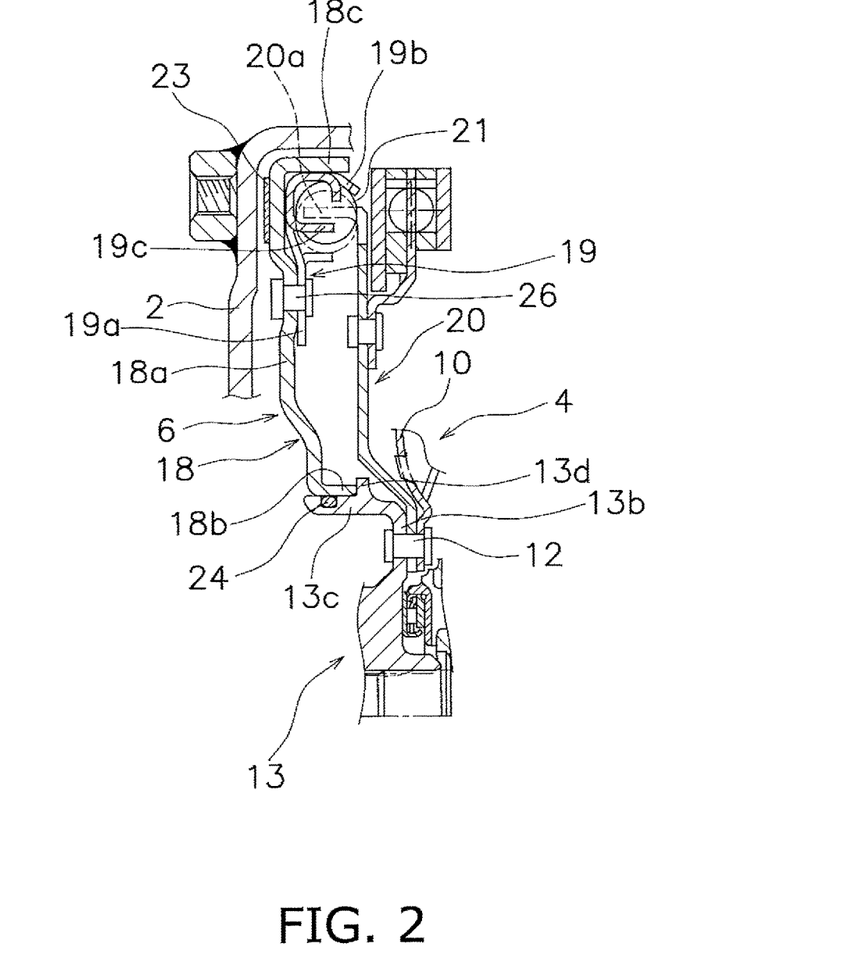
FIG. 2 is an extracted view of a lock-up device in FIG. 1.

FIG. 2 is an extracted view of the lock-up device 6. The lock-up device 6 is a device for mechanically coupling the front cover 2 and the turbine 4 as necessary, and is arranged between the front cover 2 and the turbine 4. The lock-up device 6 has a piston 18, a drive plate 19, an output plate 20 (output-side member), and a plurality of coil springs 21.

Piston 18

The piston 18 is arranged in a manner of being capable of sliding in the axial direction between the front cover 2 and the turbine 4. The piston 18 has a disc-shaped main body portion 18a, an inner circumferential tubular portion 18b that extends from the inner circumferential end of the main body portion 18a toward the turbine 4, and an outer circumferential tubular portion 18c that extends from the outer circumferential end of the main body portion 18a toward the turbine 4.

The main body portion 18a is arranged in opposition to the front cover 2. A ring-shaped friction member 23 is fixed to the side face, on the front cover 2 side, of the outer circumferential portion of the main body portion 18a. The inner circumferential tubular portion 18b is supported on the outer circumferential face of the tubular portion 13c of the turbine hub 13 in a manner of being capable of moving in the axial direction and in the rotation direction. A seal member 24 is arranged on the outer circumferential face of the tubular portion 13c of the turbine hub 13. Accordingly, the region between the inner circumferential tubular portion 18b of the piston 18 and the outer circumferential face of the tubular portion 13c of the turbine hub 13 is sealed. Note that the leading end of the inner circumferential tubular portion 18b can abut against the protrusion 13d of the turbine hub 13, and movement of the piston 18 toward the turbine 4 is restricted by the protrusion 13d.

Drive Plate 19

The drive plate 19 is arranged on the outer circumferential portion of the piston 18, on the turbine 4 side of the piston 18. Also, the drive plate 19 is arranged on radially inward of the outer circumferential tubular portion 18c of the piston 18. The drive plate 19 is ring-shaped, and has a fixing portion 19a, a plurality of spring housing portions 19b, and a plurality of engaging portions 19c.

The fixing portion 19a is formed in the inner circumferential end portion of the drive plate 19, and is fixed to the piston 18 by rivets 26. The spring housing portions 19b and the engaging portions 19c are arranged alternatingly in the circumferential direction. The spring housing portions 19b have a C-shaped cross-section, and the coil springs 21 are housed inside the spring housing portions 19b. The engaging portions 19c have a C-shaped cross-section, and a portion on the inner circumferential side and a portion on the outer circumferential side engage with the two ends of a coil spring 21. Due to these engaging portions 19c, power transmitted to the piston 18 is transmitted to the coil springs 21 via the drive plate 19.

Output Plate 20

The output plate 20 is disc-shaped, and is arranged between the piston 18 and the turbine 4. The inner circumferential end portion of the output plate 20 is fixed to the flange portion 13b of the turbine hub 13 together with the turbine shell 10 by the rivets 12. A plurality of engaging portions 20a, which are bent toward the front cover 2, are provided on the outer circumferential end portion of the output plate 20. The engaging portions 20a are engaged with the two ends of the coil springs 21.

Coil Springs 21

The coil springs 21 couple the piston 18 and the drive plate 19 to the output plate 20 elastically in the rotation direction. As previously mentioned, the coil springs 21 are housed in and supported by the spring housing portions 19b of the drive plate 19.

Dynamic Damper 7

Figure 3:
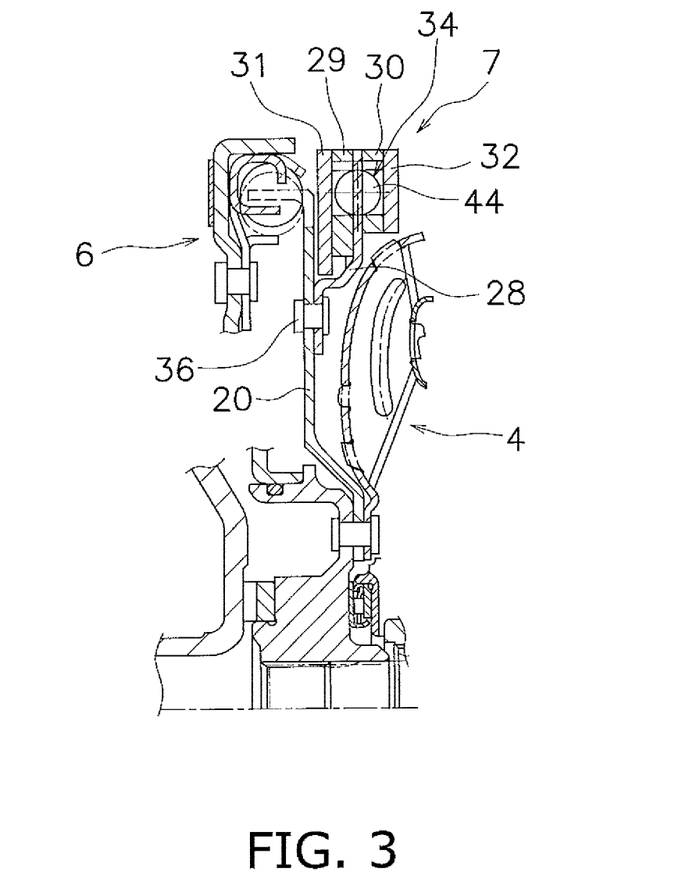
FIG. 3 is an extracted view of a dynamic damper in FIG. 1.
Figure 4:
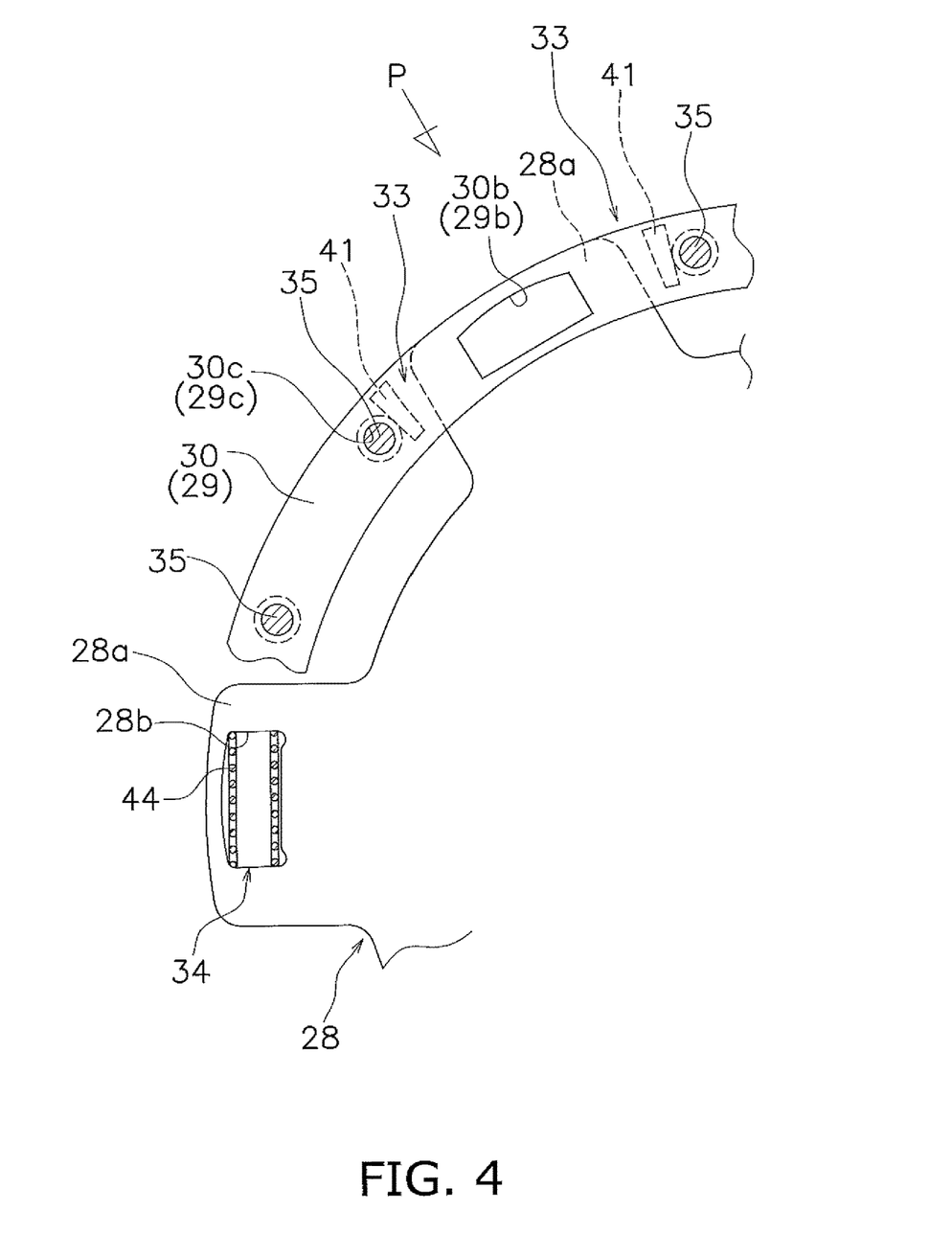
FIG. 4 is a partial front view of the dynamic damper.

The dynamic damper 7 is a device for attenuating rotational speed fluctuation from the engine, and is arranged radially outward of the turbine 4 on the turbine 4 side of the output plate 20 as shown in FIGS. 1, 3, and 4. The dynamic damper 7 has a base plate 28, first and second inertia rings 29 and 30, first and second lid members 31 and 32, variable hysteresis torque generation portions (referred to hereinafter as simply "hysteresis torque generation portions") 33, an elastic coupling portion 34, and stop pins 35. An elastic unit is configured by the hysteresis torque generation portions 33 and the elastic coupling portion 34.

Note that FIG. 4 is an external partial view of the dynamic damper 7 from the transmission side, and some members in portions, such as the lid members, have been removed from the view.

Base Plate 28

As shown in FIG. 3, the base plate 28 is disc-shaped, and the inner circumferential end portion thereof is fixed to an intermediate portion, in the diameter direction, of the output plate 20 by rivets 36. The outer circumferential portion of the base plate 28 is biased toward the transmission side in the axial direction relative to the inner circumferential end portion.

Also, as shown in FIG. 4, the base plate 28 has a plurality of protrusion portions 28a that protrude radially outward on the outer circumferential end portion of the base plate 28. An opening 28b that extends in the circumferential direction and serves as a spring housing portion is formed in each of the protrusion portions 28a.

First and Second Inertia Rings 29, 30

The first and second inertia rings 29 and 30 are formed by performing pressing on a sheet metal member. The first inertia ring 29 is arranged between the outer circumferential portion of the output plate 20 and the outer circumferential portion of the base plate 28. The second inertia ring 30 is arranged on the transmission side of the base plate 28. The outer diameter of the first inertia ring 29 is the same as that of the second inertia ring 30, but the inner diameter is smaller than that of the second inertia ring 30.

The second inertia ring 30 is shown in FIG. 4. The first inertia ring 29 and the second inertia ring 30 are only different in terms of the inner diameter dimension, and therefore reference signs for the first inertia ring 29 are also shown along with those for the second inertia ring 30 in FIG. 4.

The first and second inertia rings 29 and 30 have a plurality of spring housing portions 29b and 30b with predetermined gaps therebetween in the circumferential direction. The spring housing portions 29b and 30b are formed at positions that correspond to the spring housing portions 28b of the base plate 28. The spring housing portions 29b and 30b are openings that are closed on the outer circumferential side, and the length thereof in the circumferential direction is the same as that of the spring housing portions 28b of the base plate 28.

First and Second Lid Members 31, 32

As clearly shown in FIG. 3, the first lid member 31 is arranged farther on the engine side than the first inertia ring 29. The first lid member 31 is a ring-shaped member, and the inner diameter thereof is smaller than the inner diameter of the first inertia ring 29. The second lid member 32 is arranged farther on the transmission side than the second inertia ring 30. The second lid member 32 is a ring-shaped member, and the inner diameter thereof is the same as that of the second inertia ring 30.

Hysteresis Torque Generation Portions 33

The hysteresis torque generation portions 33 are provided at two opposing locations. The hysteresis torque generation portion 33 at one location is shown in FIG. 4. The hysteresis torque generation portion 33 generates a variable hysteresis torque according to the relative rotation angle difference between the base plate 28 and the first and second inertia rings 29 and 30 (torsion angle of the dynamic damper 7). More specifically, the hysteresis torque generation portion 33 generates a larger hysteresis torque when the relative rotation angle difference between the base plate 28 and the first and second inertia rings 29 and 30 is large than when the relative rotation angle difference is small.

Here, when the base plate 28 and the first and second inertia rings 29 and 30 undergo relative rotation, mechanical friction occurs at sliding portions. The mechanical friction at the sliding portions becomes resistance when the base plate 28 rotates relative to the first and second inertia rings 29 and 30, and this resistance becomes a low hysteresis torque that is relatively small.

Figure 5:
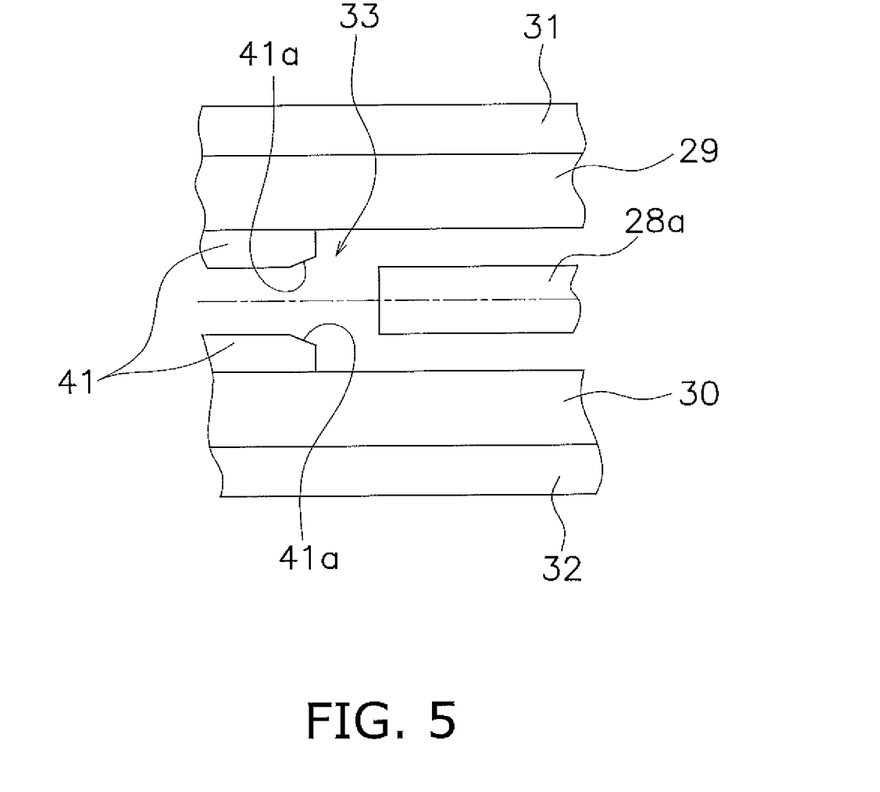
FIG. 5 is a view along an arrow P in FIG. 4, and shows a hysteresis torque generation mechanism.

In addition to the above-described sliding portions, the hysteresis torque generation portions 33 each have a pair of friction plates 41 as shown in FIGS. 4 and 5. The pair of friction plates 41 and a protrusion portion 28a of the base plate 28 (specifically a sliding contact portion that is the outer circumferential portion of the protrusion portion 28a) configure part of the hysteresis torque generation portion 33. Note that FIG. 5 is a view along an arrow P in FIG. 4.

As shown in FIG. 5, the pair of friction plates 41 are fixed to mutually opposing side surfaces (surfaces that oppose the base plate 28) of the first and second inertia rings 29 and 30. The gap between the pair of friction plates 41 in the axial direction is somewhat smaller than the thickness of the base plate 28. Accordingly, when the base plate 28 rotates a large amount relative to the first and second inertia rings 29 and 30, the outer circumferential portion (the sliding contact portion) of the protrusion portion 28a of the base plate 28 enters the space between the pair of friction plates 41. When the sliding contact portion slides between the pair of friction plates 41, a relatively large resistance, that is to say high hysteresis torque, is generated.

Note that chamfered portions 41a are formed on end portions of the pair of friction plates 41 on the base plate 28 side in the circumferential direction, such that the protrusion portion 28a of the base plate 28 easily enters the space between the pair of friction plates 41.

Elastic Coupling Portion 34

As shown in FIGS. 1 to 4, the elastic coupling portion 34 has a plurality of coil springs 44 that are housed in the spring housing portions 28b of the base plate 28 and the spring housing portions 29b and 30b of the first and second inertia rings 29 and 30. The base plate 28 is coupled elastically in the rotation direction to the two inertia rings 29 and 30 and the two lid members 31 and 32 by the coil springs 44.

Stop Pins 35

Figure 6:
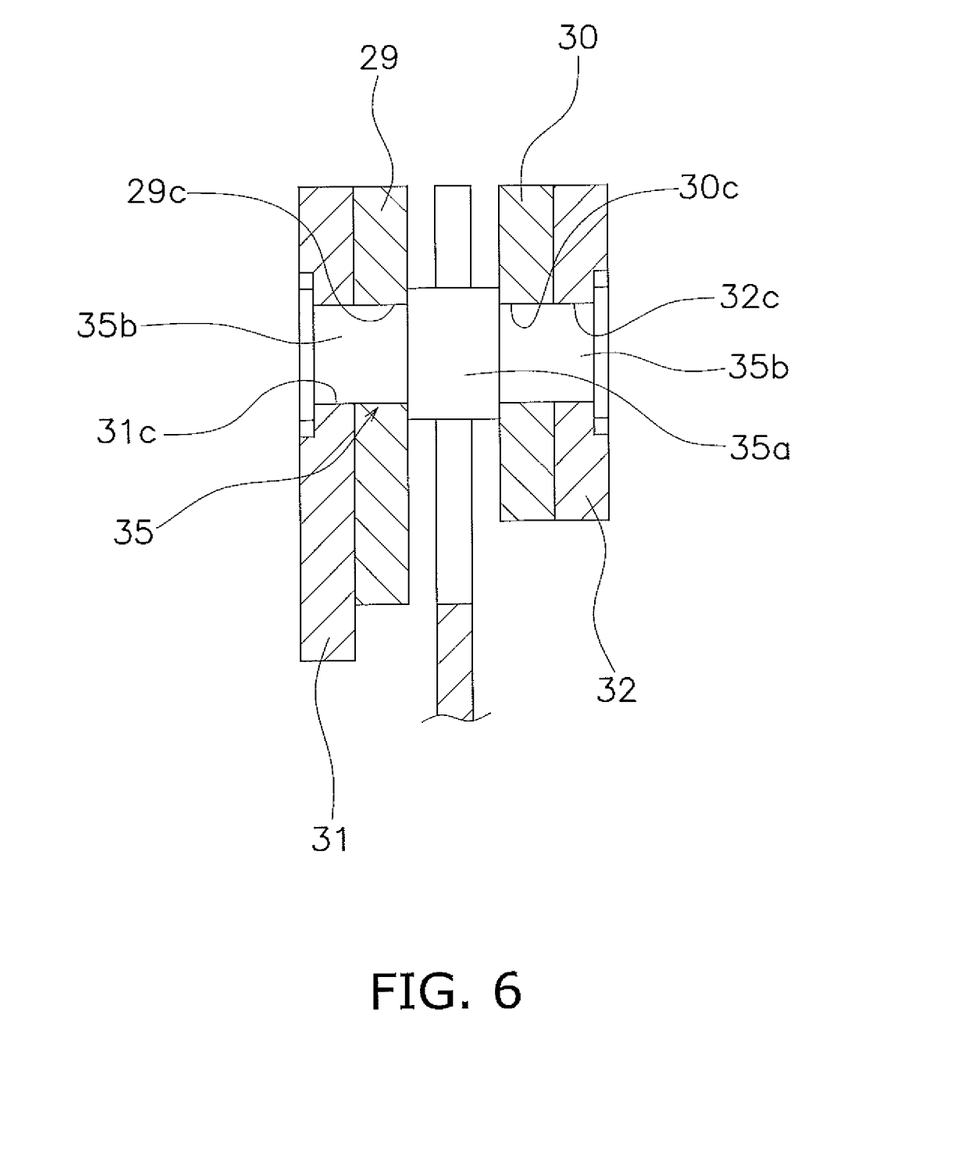
FIG. 6 is a diagram showing a stop pin of the dynamic damper.

As shown in FIG. 6, each stop pin 35 is mounted in through-holes 29c and 30c of the first and second inertia rings 29 and 30 and through-holes 31c and 32c of the first and second lid members 31 and 32. The stop pin 35 has a wide body portion 35a in the central portion in the axial direction, and narrow body portions 35b on the two sides thereof. The wide body portion 35a has a larger diameter than the through-holes 29c and 30c of the first and second inertia rings 29 and 30. Also, the thickness of the wide body portion 35a is larger than the thickness of the base plate 28.

The narrow body portions 35b are inserted in the through-holes 29c and 30c of the two inertia rings 29 and 30 and the through-holes 31c and 32c of the two lid members 31 and 32. By crimping the head portions of the narrow body portions 35b, the two inertia rings 29 and 30 and the two lid members 31 and 32 are fixed on the two sides in the axial direction of the base plate 28.

According to the above configuration, the base plate 28 can rotate relative to the two inertia rings 29 and 30 and two lid members 31 and 32 in a range in which the stop pins 35 can move between adjacent protrusion portions 28a of the base plate 28. Also, due to the wide body portions 35a of the stop pins 35 abutting against the end surfaces, in the circumferential direction, of the protrusion portions 28a of the base plate 28, relative rotation between them is restricted.

Operations

First, operations of the torque converter main body will be described briefly. While the front cover 2 and the impeller 3 are rotating, hydraulic oil flows from the impeller 3 toward the turbine 4, and power is transmitted from the impeller 3 to the turbine 4 via the hydraulic oil. The power transmitted to the turbine 4 is then transmitted to the input shaft 15 of the transmission via the turbine hub 13.

When the speed ratio of the torque converter 1 rises, and the input shaft 15 reaches a certain rotational speed, the hydraulic oil is drained from the space between the front cover 2 and the piston 18 and supplied to the turbine 4 side of the piston 18. Accordingly, the piston 18 is moved toward the front cover 2. As a result, the friction member 23 fixed to the piston 18 is pressed against the front cover 2, and the lock-up clutch enters the ON state.

In the clutch ON state described above, power from the engine is transmitted to the input shaft 15 of the transmission via the following path: front cover 2→piston 18→drive plate 19→coil spring 21→output plate 20→turbine hub 13.

With the lock-up device 6, power is transmitted via the above-described path, and rotational speed fluctuation input from the engine is absorbed and attenuated by the operation of the coil springs 21.

Operations of Dynamic Damper 7

The dynamic damper 7, which is fixed to the output plate 20, operates due to rotation of the output plate 20, and rotational speed fluctuation from the engine is suppressed by the action of the dynamic damper 7. In other words, the action of the coil springs 44 produces phase shift between the rotation of the base plate 28 and the rotation of the inertia rings 29 and 30 and lid members 31 and 32. Specifically, at a predetermined engine speed, the fluctuation phase of the inertia rings 29 and 30 and the lid members 31 and 32 cancels out the rotational speed fluctuation of the base plate 28. Due to this phase shifting, it is possible to absorb rotational speed fluctuation in the transmission.

Figure 7:
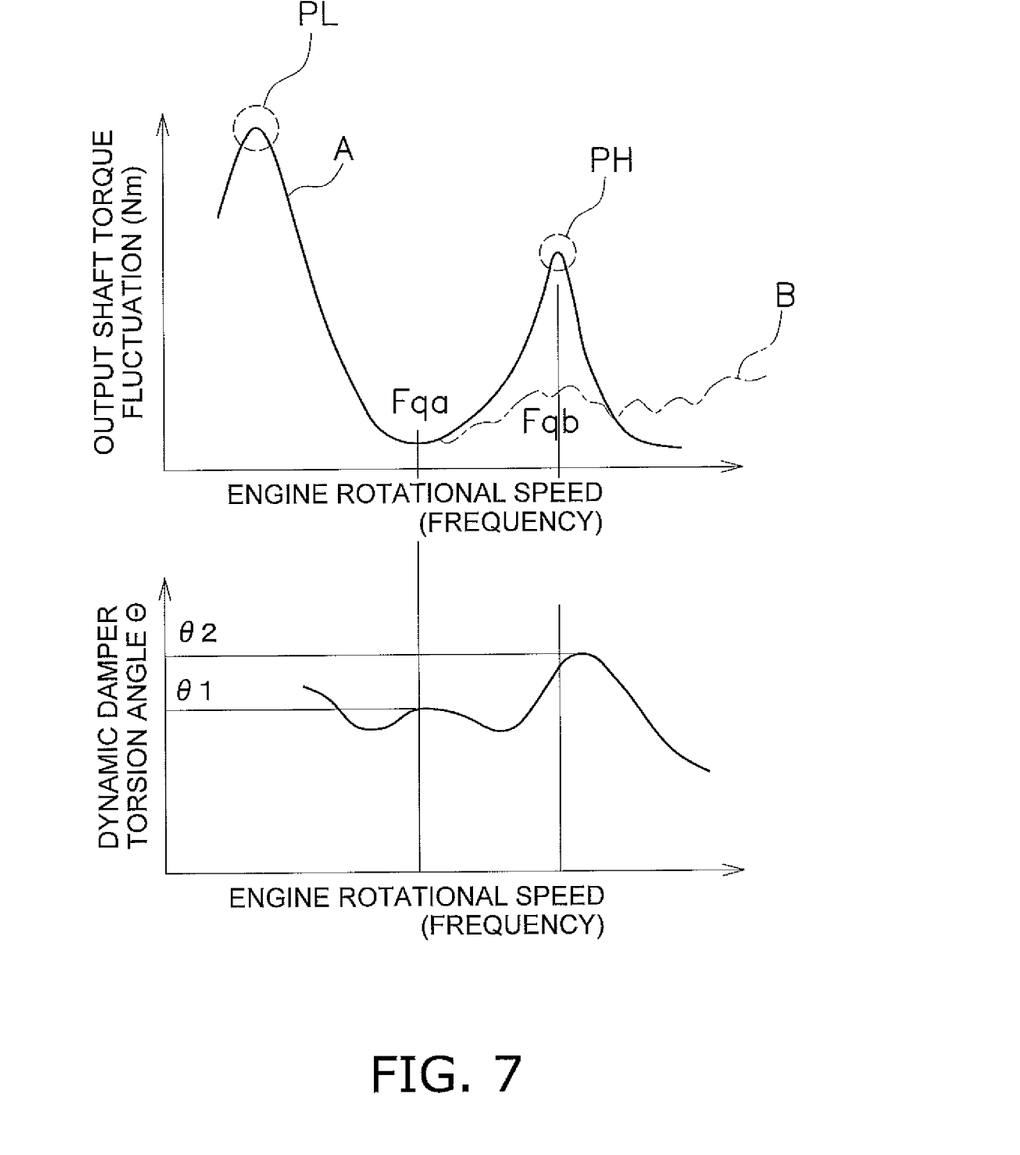
FIG. 7 is a characteristic diagram of engine rotation speed and rotational speed fluctuation.

FIG. 7 shows the relationship that engine rotational speed (frequency) has with the torsion angle of the dynamic damper 7 (relative angle between the base plate 28 and the inertia rings 29 and 30 and lid members 31 and 32) and torque fluctuation (rotational speed fluctuation) transmitted to the transmission side. In FIG. 7, in a range in which the engine rotational speed is low, the torsion angle is relatively small as indicated by $\theta 1$ in the dynamic damper 7. Also, in a range in which the engine rotational speed is high, the torsion angle is larger as indicated by $\theta 2$.

In FIG. 7, Fqa indicates the resonance frequency (natural frequency) at which vibration of the output plate 20 is lowest when the base plate 28 vibrates with a phase opposite to that of the inertia rings 29 and 30 and lid members 31 and 32. Also, Fqb indicates the frequency of a peak when the inertia rings 29 and 30 and lid members 31 and 32 amplify the vibration of the base plate 28.

As shown by a characteristic A in FIG. 7, when the dynamic damper 7 is mounted to the output plate 20, attenuation is suppressed at the frequency Fqa. However, torque fluctuation peaks PL and PH appear at two locations in the low rotational speed range and the high rotational speed range. Here, the peak PL in the low rotational speed range is in a rotational speed range in which lock-up is not performed, and therefore is not a problem.

On the other hand, the peak PH in the high rotational speed range appears in the normal rotational speed range, and therefore it is very important to suppress this peak PH or move it to the high rotational speed side relative to the normal rotational speed range.

In view of this, in the present embodiment, in the range in which the torsion angle of the dynamic damper 7 is small, a small hysteresis torque is generated, and in the range in which the torsion angle is large, a larger hysteresis torque is generated. For this reason, with the present embodiment, it is possible to reduce the peak PH in the range in which the torsion angle is large, while also reducing torque fluctuation in the range in which the engine rotational speed is low and the torsion angle of the dynamic damper 7 is small. A characteristic B in this case is indicated by a dashed-dotted line.

Other Embodiments

The present disclosure is not limited to the embodiment described above, and various modifications and alterations can be made without departing from the scope of the present disclosure.

(a) Although the torsional characteristic of the dynamic damper 7 is a one-stage characteristic in the above embodiment, the torsional characteristic of the dynamic damper may be a characteristic having two or more stages.

Figure 8:
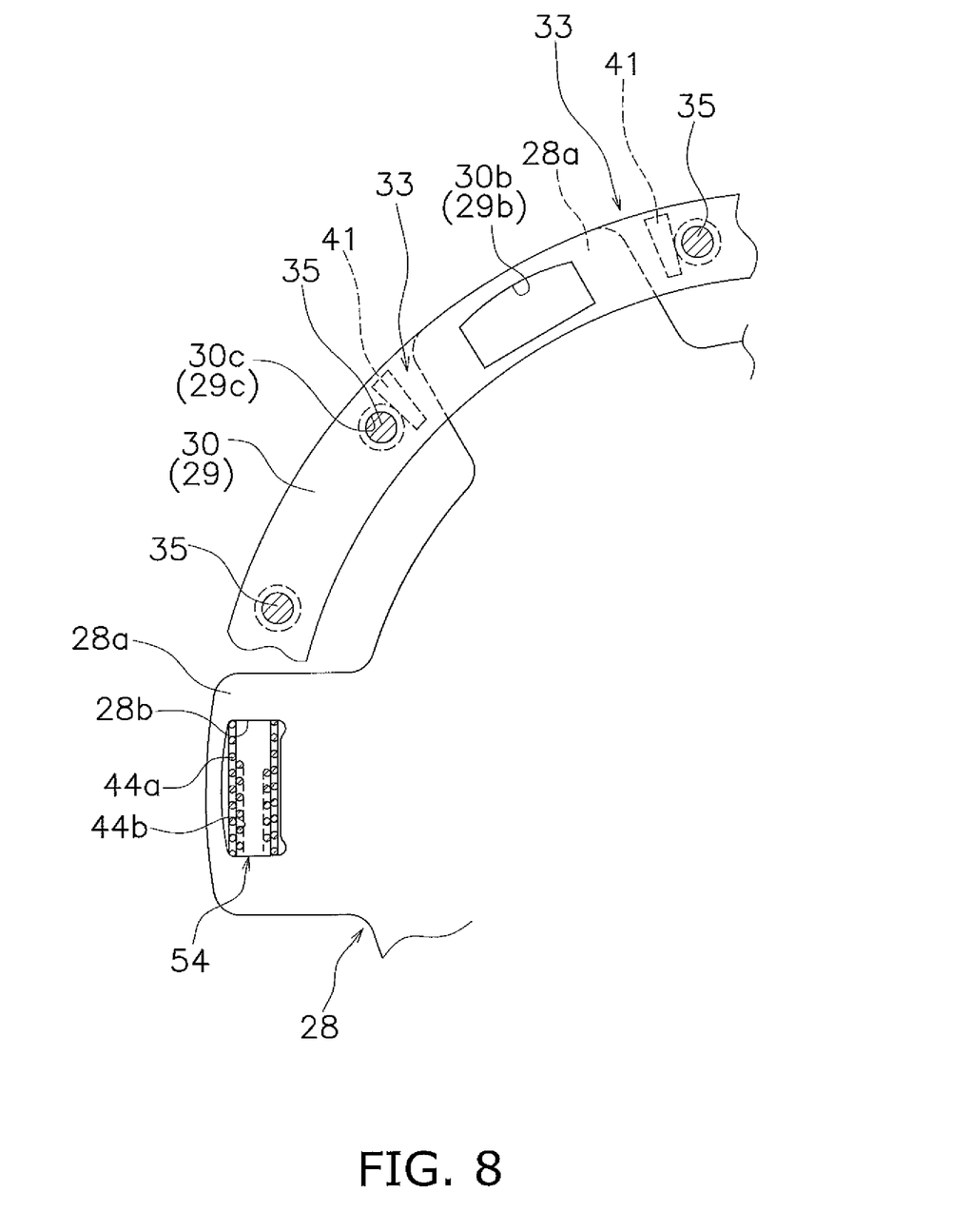
FIG. 8 is a diagram regarding another embodiment of the present invention, and corresponds to FIG. 4.

FIG. 8 shows an example of this case. An elastic coupling portion 54 shown in FIG. 8 is configured by large and small coil springs 44a and 44b that are housed in the spring housing portions 28b. The large coil springs 44a have approximately the same length as the circumferential length of the spring housing portions 28b. Accordingly, the two end portions of the large coil springs 44a abut against the end portions, in the circumferential direction, of the spring housing portions 28b of the base plate 28 and the spring housing portions 29b and 30b of the inertia rings 29 and 30. Also, the small coil springs 44b are arranged inside the large coil springs 44a, and have a shorter length than the large coil springs 44a. For this reason, the small coil springs 44b operate with a delay after operation of the large coil springs 44a.

Also, in this embodiment, the timing when the protrusion portions 28a of the base plate 28 enter the spaces between the pairs of friction plates 41 is matched with the timing when the operation of the small coil springs 44b of the elastic coupling portion 54 starts.

Figure 9:
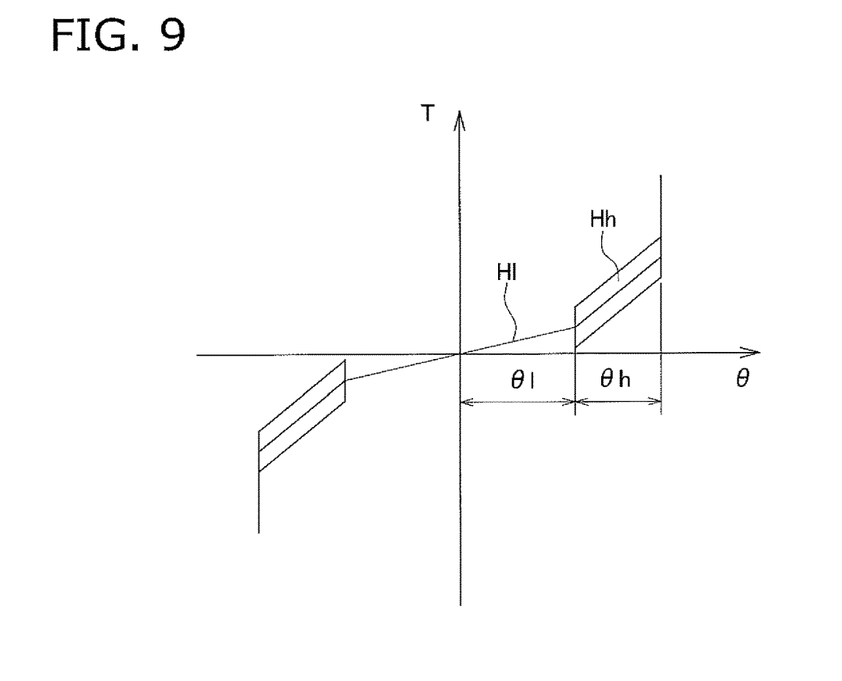
FIG. 9 is a torsion characteristic line diagram for a dynamic damper according to another embodiment of the present disclosure.

FIG. 9 shows torsional characteristics of the dynamic damper of the embodiment shown in FIG. 8.

In this example, when relative rotation occurs between the base plate 28 and the inertia rings 29 and 30 and lid members 31 and 32, as shown in FIG. 9, in a low torsion angle range θl, firstly only the large coil springs 44a become compressed, and the dynamic damper operates with a low-rigidity torsional characteristic (a first-stage torsional characteristic). In this case, the inertia rings 29 and 30 and lid members 31 and 32 rotate relative to the base plate 28 with a low hysteresis torque Hl that is relatively small and is generated by only mechanical friction, and rotational speed fluctuation can be suppressed effectively.

Then, when larger rotation fluctuation occurs, and even larger relative rotation occurs between the base plate 28 and the inertia rings 29 and 30 and lid members 31 and 32 (high torsion angle range θh), the small coil springs 44b become compressed in addition to the large coil springs 44a. For this reason, the dynamic damper operates with a high-rigidity torsional characteristic (second-stage torsional characteristic) in which the rigidity is higher than in the first-stage torsional characteristic.

Moreover, in this high torsion angle range θh, the protrusion portions 28a of the base plate 28 enter the spaces between the pairs of friction plates 41, and a high hysteresis torque Hh that is higher than the low hysteresis torque Hl is generated.

In this embodiment as well, the second-stage high hysteresis torque acts effectively, and it is possible to suppress torque fluctuation transmitted to the output shaft in the range in which the engine rotational speed is high. For this reason, it is possible to suppress torque fluctuation over the entirety of the normal rotational speed range.

Figure 10:
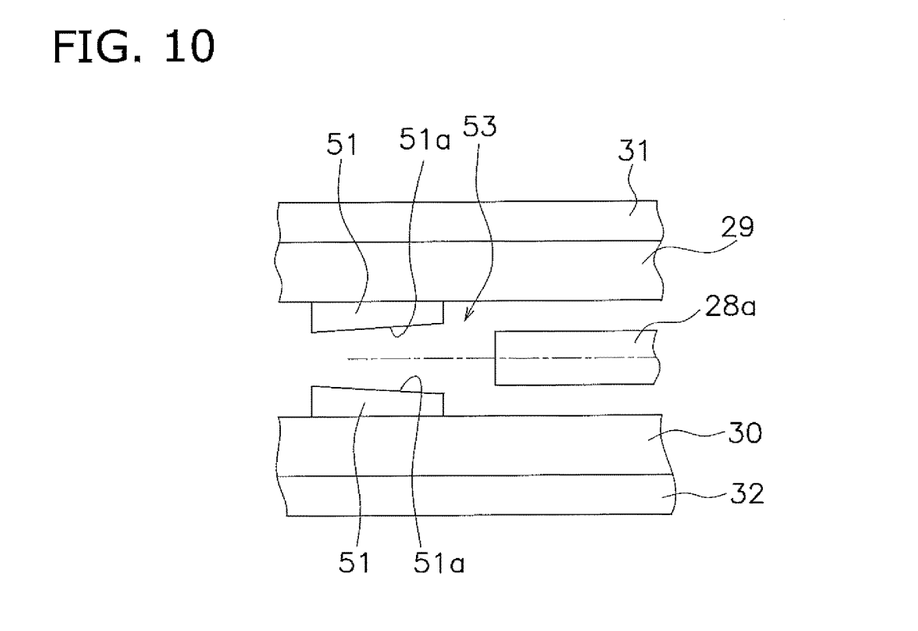
FIG. 10 is a diagram regarding another embodiment of the present disclosure, and corresponds to FIG. 5.

(b) The configuration of the variable hysteresis torque generation portion is not limited to the above embodiment. A variable hysteresis torque generation portion 53 according to another embodiment is shown in FIG. 10. Similarly to the above embodiment, in this variable hysteresis torque generation portion 53, a pair of friction plates 51 are provided on mutually opposing side surfaces of the pair of inertia rings 29 and 30. Also, mutually opposing surfaces of the pair of friction plates 51 are inclined surfaces 51a. More specifically, the opposing surfaces of the pair of friction plates 51 are inclined in a manner in which the gap decreases with increasing distance from the protrusion portion 28a of the base plate 28.

In this embodiment, the hysteresis torque increases as the swing of the inertia rings 29 and 30 increases. Accordingly, similarly to the above, it is possible to suppress torque fluctuation transmitted to the output shaft in the range in which the engine rotational speed is high, and it is possible to suppress torque fluctuation over the entirety of the normal rotational speed range.

(c) Although the clutch portion is configured by the piston and the friction member in the above embodiment, the clutch portion may be a multi-plate clutch portion that has a plurality of clutch plates.

(d) Although the dynamic damper is mounted to an output-side member in the above embodiment, it may be mounted to another member.

REFERENCE SIGNS LIST

1 Torque converter
2 Front cover
4 Turbine
6 Lock-up device
7 Dynamic damper
8 Torque converter main body
20 Output plate (output-side member)
21 Coil spring
28 Base plate
28a Protrusion portion
28b Spring housing portion
29, 30 Inertia ring
29b, 30b Spring housing portion
31, 32 Lid member
33, 53 Variable hysteresis torque generation portion
34, 44 Elastic coupling portion
44 Coil spring

The invention claimed is:

1. A hydraulic power transmission device for transmitting power from an engine to a transmission via a fluid, the hydraulic power transmission device comprising:
a front cover;
a fluid coupling main body including a turbine configured to rotate integrally with an input shaft of the transmission, the fluid coupling main body for transmitting power from the engine to the transmission via the fluid;
a lock-up device provided between the front cover and the turbine, the lock-up device including a clutch portion and an output-side member, the clutch portion for transmitting or cutting off power from the front cover, the output-side member for receiving power from the clutch portion, the output-side member coupled to the turbine; and
a dynamic damper for attenuating rotational speed fluctuation from the engine;
the dynamic damper including a base plate, an inertial body and an elastic unit;

the base plate fixed to the output-side member of the lock-up device;

the inertial body having a first inertia ring that is arranged on one end side in an axial direction of the base plate, and a second inertia ring that is arranged in opposition to the first inertia ring with the base plate therebetween;

the inertial body configured to move in a rotation direction relative to the base plate;

the elastic unit having
   a pair of friction members provided on mutually opposing side surfaces of the first and second inertia rings, and
   a sliding contact portion protruding outward in a diameter direction on an outer circumferential portion of the base plate, and that comes into sliding contact with the pair of friction members in a range in which a relative rotation angle difference between the base plate and the first and second inertia rings is large;

the elastic unit configured to generate a variable hysteresis torque according to a relative rotation angle difference between the base plate and the inertial body, the elastic unit coupling the base plate and the inertial body elastically in the rotation direction.

2. The hydraulic power transmission device according to claim 1, wherein the dynamic damper is fixed to the output-side member of the lock-up device.

3. The hydraulic power transmission device according to claim 1, wherein the elastic unit generates a larger hysteresis torque when the relative rotation angle difference between the base plate and the inertial body is larger than when the relative rotation angle difference between the base plate and the inertial body is small.

4. The hydraulic power transmission device according to claim 1, wherein the elastic unit has a variable hysteresis torque generation portion that generates the variable hysteresis torque, and an elastic coupling portion that has a plurality of elastic members.

5. The hydraulic power transmission device according to claim 4, wherein the variable hysteresis torque generation portion has the pair of friction members and the sliding contact portion.

6. A hydraulic power transmission device for transmitting power from an engine to a transmission via a fluid, the hydraulic power transmission device comprising:
   a front cover;
   a fluid coupling main body including a turbine configured to rotate integrally with an input shaft of the transmission, the fluid coupling main body for transmitting power from the engine to the transmission via the fluid;
   a lock-up device provided between the front cover and the turbine, the lock-up device including a clutch portion and an output-side member, the clutch portion for transmitting or cutting off power from the front cover, the output-side member for receiving power from the clutch portion, the output-side member coupled to the turbine; and
   a dynamic damper for attenuating rotational speed fluctuation from the engine;
   the dynamic damper including a base plate, an inertial body and an elastic unit;
   the base plate fixed to the output-side member of the lock-up device;
   the inertial body configured to move in a rotation direction relative to the base plate;
   the elastic unit configured to generate a variable hysteresis torque according to a relative rotation angle difference between the base plate and the inertial body, the elastic unit coupling the base plate and the inertial body elastically in the rotation direction, wherein the elastic unit has a low-rigidity torsional characteristic in a first range in which a relative rotation angle difference between the base plate and the inertial body is small, and has a high-rigidity torsional characteristic having a higher rigidity than in the low-rigidity torsional characteristic in a second range that is higher than the first range.

7. The hydraulic power transmission device according to claim 6, wherein the elastic unit has a variable hysteresis torque generation portion that generates the variable hysteresis torque, and an elastic coupling portion that has a plurality of elastic members.

8. The hydraulic power transmission device according to claim 7, wherein the elastic coupling portion has
   a plurality of first elastic members that couple the base plate and the inertial body elastically in the rotation direction, and
   a plurality of second elastic members that couple the base plate and the inertial body elastically in the rotation direction, and that operate with a delay after the plurality of first elastic members when the base plate and the inertial body undergo relative rotation.

* * * * *

UNITED STATES PATENT AND TRADEMARK OFFICE
CERTIFICATE OF CORRECTION

PATENT NO. : 10,260,612 B2
APPLICATION NO. : 15/502713
DATED : April 16, 2019
INVENTOR(S) : Yuki Kawahara, Yusuke Okamoto and Yusuke Okamachi Page 1 of 1

It is certified that error appears in the above-identified patent and that said Letters Patent is hereby corrected as shown below:

On the Title Page

Insert --(73) Assignee: EXEDY CORPORATION, Neyagawa-Shi, Osaka (JP)--

Signed and Sealed this
Eleventh Day of February, 2020

Andrei Iancu
*Director of the United States Patent and Trademark Office*